United States Patent

[11] 3,620,663

| [72] | Inventor | Winfried Kruckenberg |
| | | Leverkusen, Germany |
| [21] | Appl. No. | 642,684 |
| [22] | Filed | June 1, 1967 |
| [45] | Patented | Nov. 16, 1971 |
| [73] | Assignee | Farbenfabriken Bayer Aktiengesellschaft |
| | | Leverkusen, Germany |
| [32] | Priority | June 10, 1966 |
| [33] | | Germany |
| [31] | | F 49435 |

[54] PROCESS FOR THE DYEING OF SYNTHETIC FIBER MATERIALS AND BLENDS WITH QUATERNARY NITROGEN GROUP CONTAINING DYESTUFFS
8 Claims, No Drawings

[52] U.S. Cl. .................................................. 8/21,
8/41, 8/162, 8/178, 8/179
[51] Int. Cl. ...................................................... D06p 3/82
[50] Field of Search ............................................ 8/1.214, 55,
21, 55 AB, 53 R, 178, 179, 180, 177 AB, 41, 162

[56] References Cited
UNITED STATES PATENTS

| 2,821,526 | 1/1958 | Boyd ............................ | 8/55 AB X |
| 3,293,246 | 12/1966 | Fuchs et al. .................. | 8/55 R X |

FOREIGN PATENTS

| 397,595 | 2/1966 | Switzerland ................. | 8/1.214 |
| 1,271,416 | 7/1961 | France ......................... | 8/1.214 |
| 1,433,060 | 2/1966 | France ......................... | 8/55 AB |
| 914,074 | 12/1962 | Great Britain................ | 8/41 |

OTHER REFERENCES

E. R, Trotman, Dyeing and Chemical Technology of Textile Fibers, 3rd Ed., 1964, pp. 138- 140 Copy in POSL TP893T7 1964 C2

*Primary Examiner*—George F. Lesmes
*Assistant Examiner*—T. J. Herbert, Jr.
*Attorney*—Plumley, Tyner and Sandt ABSTRACT: Process for dyeing synthetic fiber materials e.g. aromatic polyester, and fiber blends, e.g. blends of polyester with wool, in an aqueous solution at a pH of 4–6.5 at temperatures of about 98° to 140° C. with a quaternary nitrogen group containing dyestuff, said dyestuff being free of sulfonic and carboxylic acid groups.

PROCESS FOR THE DYEING OF SYNTHETIC FIBER MATERIALS AND BLENDS WITH QUATERNARY NITROGEN GROUP CONTAINING DYESTUFFS

It has been found that fully synthetic and semi-synthetic fiber materials made of aromatic polyesters, such as polyethylene terephthalates and polyesters obtained from terephthalic acid and 1,4-bis-hydroxymethyl-cyclohexane; cellulose esters, such as cellulose triacetate and cellulose 2½-acetate; polyolefines, such as polypropylene; polyvinyl chloride and synthetic superpolyamides and -polyurethanes can be dyed in a simple manner to achieve outstanding fastness properties by applying organic dyestuffs which are free from sulfonic acid and carboxylic acid groups and contain at least one grouping of the formula

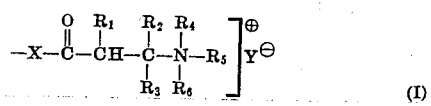

to the material to be dyed under acidic conditions, preferably at pH 4–5, and at an elevated temperature. In the general formula (I) the symbol X denotes a single bond or a bridge member; $R_1$, $R_2$ and $R_3$ are hydrogen or lower alkyl radicals with one–two carbon atoms; $R_4$ is an unbranched radical — $C_nH_{2n+1}$ wherein $n$ represents an integer from 0 to 4; $R_5$ is the radical $R_4$ or an alkenyl, alkoxyalkyl, carboalkoxyalkyl, isoalkyl, alkyl-thioalkyl or alkyl-carbonylalkyl group; $R_6$ is a cyanoalkyl, alkenyl, alkoxy-alkyl, carboalkoxyalkyl, isoalkyl, alkyl-thioalkyl, alkylcarbonylalkyl, cyclohexyl group or an alkyl radical which may be fused with an alkyl radical $R_5$ to form a ring, optionally with the inclusion of a further hetero atom; and Y is an anion.

Suitable bridge members X are, inter alia,

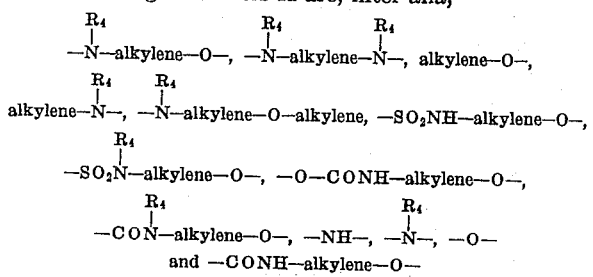

and —CONH—alkylene—O—

Suitable unbranched alkyl radicals $R_4$ are methyl, ethyl, propyl and butyl. Suitable radicals $R_5$ are, besides the alkyl radicals mentioned for $R_4$, inter alia,

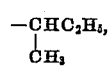

—$CH_2CH=CH_2$, —$CH_2H_4OCH_3$, —$CH_2$e.g., 3, —$C_2H_4SCH_3$, —$C_2H_4COOCH_3$, —$CH_2COCH_3$ and —$C_2H_4COCH_3$. Suitable radicals $R_6$ have already been mentioned for $R_5$; in addition, the following are also suitable; the cyclohexyl radical, —$CH_2CN$, —$C_2H_4CN$ or, in the case of an alkyl radical which is fused with an alkyl radical $R_5$ to form a ring, optionally with the inclusion of a further hetero atom, the morpholine and piperidine rings.

The dyestuffs to be used according to the present process, which contain at least one grouping of the general formula (I), may belong to various classes, for example, to the series of metal-containing or metal-free mono- or poly-azo dyestuffs or (azo)methine dyestuffs, phthalocyanine dyestuffs, to the series of anthraquinone dyestuffs and condensation products of the latter which contain more than 3 fused nuclei; other suitable dyestuffs are oxazine, nitro, diphenylamine and di- or triphenyl-methane dyestuffs, naphtholactam condensation dyestuffs, dyestuffs based on naphthoquinone and naphthoquinonimine and other condensation dyestuffs. With the exception of sulfonic acid and carboxylic acid groups, the dyestuffs may contain customary substituents, such as halogen, alkyl, cycloalkyl, aralkyl, aryl, alkoxy, aryloxy, nitro, sulfone groups, optionally substituted or acylated amino groups, alkylthio and arylthio, hydroxy, aminoalyloxy, cyano, cyanoalkyl radicals or differently substituted alkyl, aryl, aralkyl radicals and the like.

The dyestuffs useful in the present process can be represented by the formula

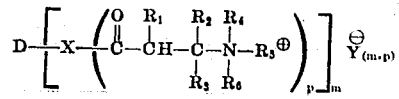

wherein D is an organic dyestuff radical, m and p are 1 or 2, m+p=2 or 3 and the remaining symbols have the meanings set forth above.

The dyestuffs to be used in the present process can be synthetised in the usual manner by various methods, for example, by reacting a dyestuff which contains the grouping

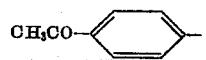

with formaldehyde and an aminochlorohydrate in acetic acid, or by first reacting a dyestuff which contains a hydroxyl group, preferably an external hydroxyl group, or/and an amino group, with compounds of the general formula

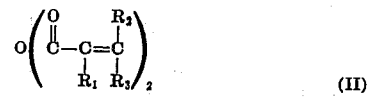

or

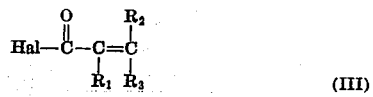

then adding a suitable amine with at least one hydrogen atom attached to the nitrogen atom on to the resultant dyestuff, followed by salt formation or quaternisation. The compounds (II) and (III) can also be replaced with the following compounds:

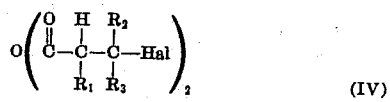

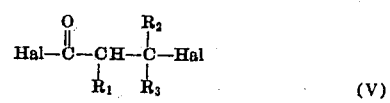

The resultant dyestuffs are then likewise reacted with suitable amines and yield the dyestuffs to be used according to the invention, which contain at least one grouping of the general formula (I). Dyestuff intermediates can be reacted in the same manner and then converted into the desired final dyestuffs by usual methods.

Depending on the number of reactive groups of the dyestuff, the final dyestuffs contain one or more groupings of the formula (I). A great number of known mono- and disazo dyestuffs are suitable for the introduction of groupings of the formula (I). A preferred group of azo dyestuffs into which one or more groupings (I) can be introduced corresponds to the formulas

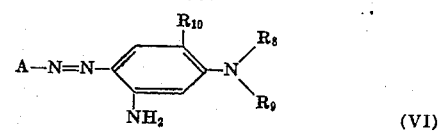

and

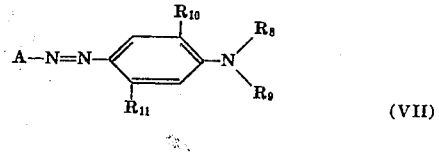

in which A denotes the radical or a carbocyclic or heterocyclic diazo component, preferably of the benzene series, which may contain further substituents with the exception of sulfonic acid and carboxylic acid groups, such as nitro; halogen; especially Cl or Br; alkyl, such as $CH_3$ and $C_2H_5$; alkoxy, such as $-OCH_3$ and $-OC_2H_5$; trifluoroalkyl, such as trifluoromethyl; sulfone and/or cyano groups; $R_{10}$ is hydrogen, and alkyl or alkoxy radical; $R_8$ is hydrogen or a substituent which may be identical with $R_9$; $R_9$ denotes an alkyl or substituted alkyl radical, such as cyanoalkyl, hydroxyalkyl, haloalkyl; esterified hydroxyalkyl groups, esterified carboxyalkyl groups; β-carboxyethyl groups which are preferably esterified with a lower aliphatic alcohol; and alkoxycarbonyl-hydroxyalkyl groups; and $R_{11}$ is hydrogen, an alkyl, alkoxy or acylamino group; at least one of the radicals $R_8$ and $R_9$ in the formula (VII) must contain an aliphatically linked hydroxyl group suitable for the reaction, i.e. for the introduction of a grouping of the formula (I).

Another group of suitable dyestuffs corresponds to the formulas (VI) and (VII) and contains in the nucleus A a substituent $CH_3CO-$ on which the reaction to introduce the grouping (I) can take place.

Diazo components suitable for the synthesis of these and other usable azo dyestuffs are, for example 1-amino-4-methyl-benzene, 1-amino-4chlorobenzene, 1-amino-4-bromobenzene, 1-amino-4-nitrobenzene, 1-amino-4-cyanobenzene, 1-amino-4-methyl-sulphonyl-benzene, 4-amino-benzoic acid methyl ester, 1-amino-2,4-dichlorobenzene, 1-amino-2-methyl-4-chlorobenzene, 1-amino-2-trifluoromethyl-4-chlorobenzene, 1-amino-2-cyano-4-cholorbenzene, 1-amino-2-chloro-4-cyanobenzene, -- amino-2-chloro-4-nitrobenzene, 1-amino-4-chloro-2-methyl-sulphonyl-benzene, 1-amino-2,4-dicyanobenzene, 1-amino-2cyano-4-methylsulphonyl-benzene, 1-amino-4cyano-2-methylsulphonyl-benzene, 1-amino-2,4-bis-(methylsulphonyl)-benzene, 1-amino-2,6-dichloro-4-nitrobenzene, 1-amino-2,6-dibromo-4-methylsulphonyl-benzene, 1-amino-2-methyl-4-nitrobenzene, 1-amino-2-trifluoromethyl-4-nitrobenzene, 1-amino-2-chloro-4-nitrobenzene, 1-amino-2-cyano-4-nitrobenzene, 1-amino-2-methylsulphonyl-4-nitrobenzene, 1-amino-2,4-dinitrobenzene, 1-amino-2,4-dinitro-6-chlorobenzene, 1-amino-2,4-dinitro-6-bromobenzene, 1-amino-2,4-dinitro-6-cyanobenzene, 1-amino-4-acetylaminobenzene, 2-amino-6-cyanobenzothiazole-1,3,1-amino-4-methylsulphonyl-hydroxyethylsulphonyl-methyl-benzene, 1-amino-2,6-dichloro-4-cyanobenzene, 1-amino-2-cyano-6-bromobenzene, 1-amino-2-bromo-4-acetobenzene, 1-amino-5-nitrothiazole, as well as the derivatives substituted in the 4-position by ethyl, cyano, trifluoromethyl, phenyl or substituted phenyl radicals, 1-amino-2-nitro-4-acetobenzene, 5-aminobenzothiadiazole-1,2,3, 5-aminobenzothiazole-1,2, 5-aminobenzotriazole-1,2,3, 2-amino-4-phenyl-thiadiazole-1,3,5 and their derivatives substituted in the phenyl nucleus, aminoazobenzene, aminoazotoluene, 1-acetylamino-3-aminobenzene and p-amino-acetophenone.

Other diazo components suitable for the preparation of the dyestuffs to be used according to the invention are the following, for example:

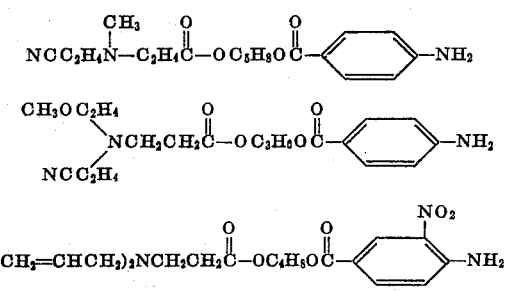

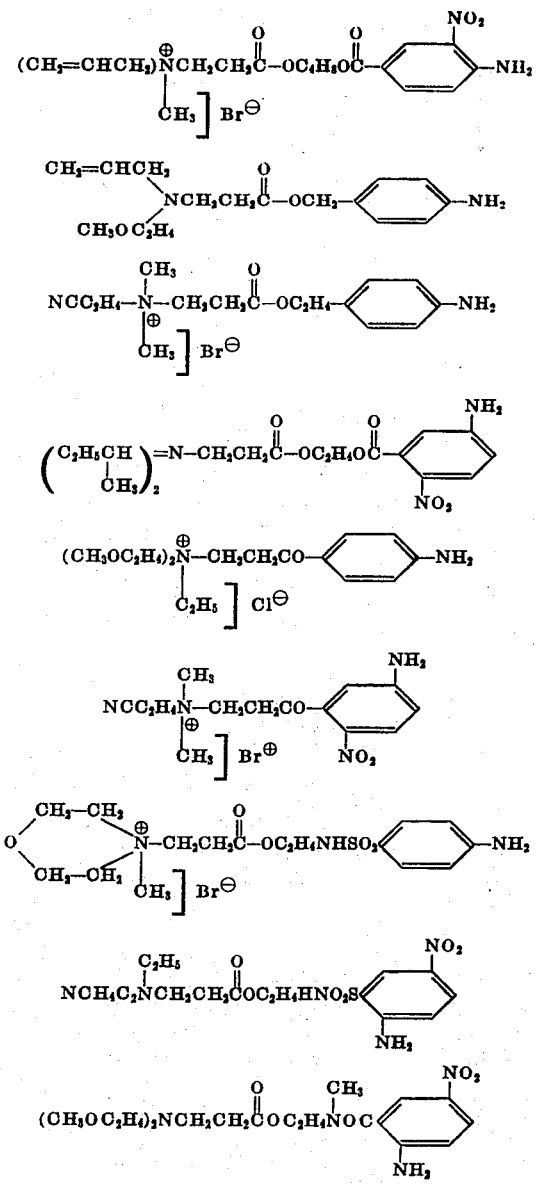

If the above diazo components are used and the grouping

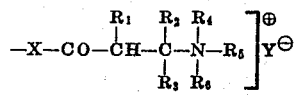

is not already present, it is obtained after coupling with suitable coupling components by salt formation or quaternization.

Coupling components which are suitable for the synthesis of the azo dyestuffs to be used according to the invention are, for example, those of the benzene, naphthalene, pyrazolone, acylacetic acid amide, aminopyrazole and hydroxy- or aminoquinoline series. The great number of suitable components include, for example, the following;

1-phenyl-3-methyl-pyrazolone and the derivatives substituted in the phenyl nucleus, e.g. by the substituents mentioned above; 1-phenyl-5-pyrazolone-3-carboxylic acid esters, particularly the esters with lower aliphatic alcohols, and the derivatives further substituted in the phenyl nucleus; 1-phenyl-3-methyl-5-aminopyrazole and the derivatives further substituted in the phenyl nucleus; acetoacetic acid-alkyl, -aralkyl- and -arylamides and the derivatives further substituted on the aralkyl and aryl radicals; α- and β-naphthylamine and the derivatives further substituted in the naphthyl nucleus; α- and β-naphthol, 1-amino-5-naphthol and the derivatives further substituted in the aryl nucleus and on the amino group; 8-hydroxy-quinoline.
Furthermore, coupling components of the following formulas can be used, for example:
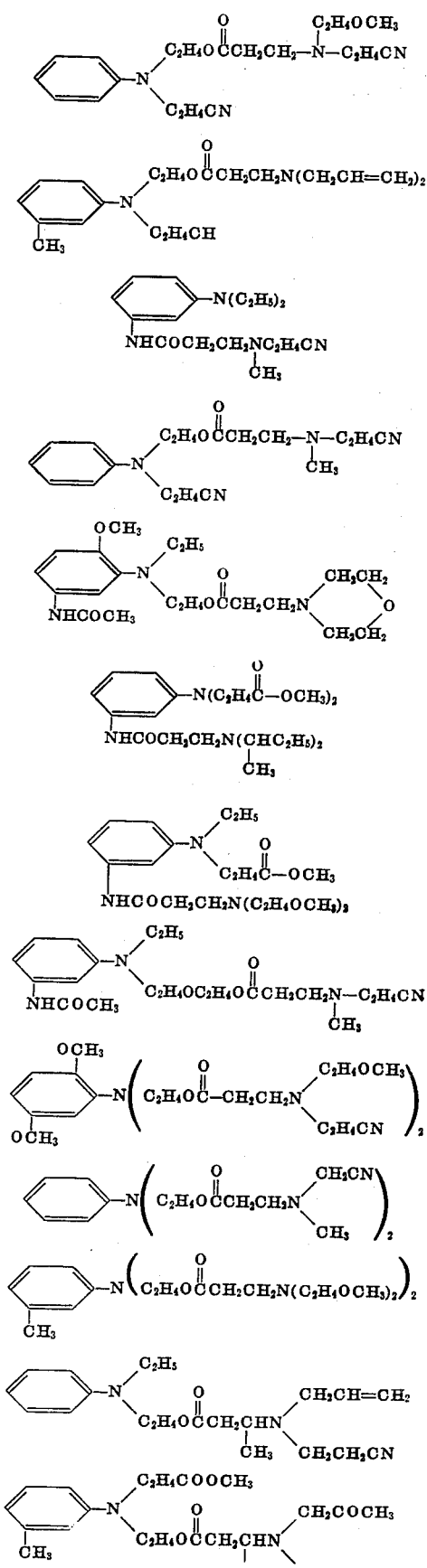
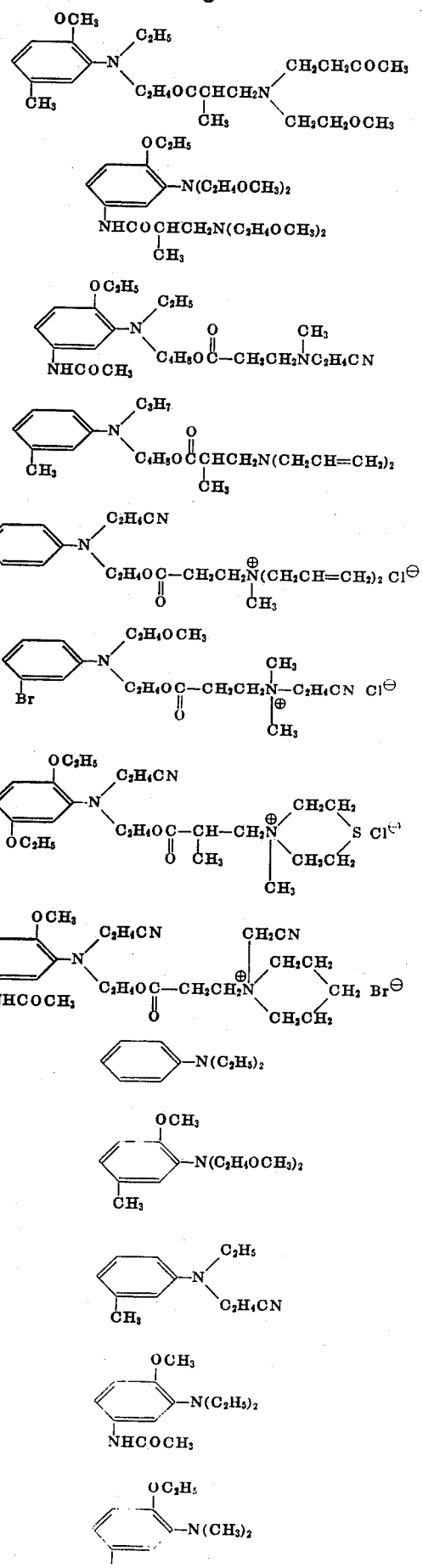

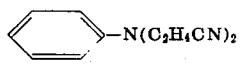

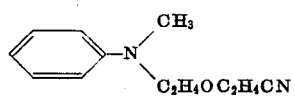

When coupling components with the grouping

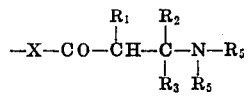

are used, the grouping

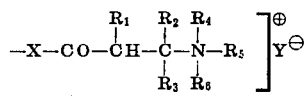

is obtained by salt formation or quaternisation.

For dyeing fully synthetic or semi-synthetic fiber materials of the aforesaid type, the dyestuffs which contain at least one grouping of the formula (I) are dissolved in a small amount of water, preferably with the addition of some glacial acetic acid and some sodium acetate; to prepare stock solutions, the amounts are so chosen that the pH is adjusted to between 3 and 4. For dyeing, a suitable amount is taken from this solution and sufficient sodium acetate is added to adjust the dyebath to a pH between 4 and 6.5, preferably of 5. The dyeing is carried out in the manner customary for disperse dyestuffs. Dispersing agents are not necessary. For dyeing fiber materials of aromatic polyesters, the usual carriers are added when dyeing is carried out at 98°–100° C; if dyeing is performed at a higher temperature, for example, at 120°–140° C., carriers need not be added, as when dyeing with disperse dyestuffs.

Other buffer systems may also be used for adjusting the pH, for example, citrate or phosphate buffers. A substantial part of the dyestuffs dissolve very readily in organic, strongly polar solvents, for example in formamide or dimethyl formamide, preferably with the addition of some glacial acetic acid, and thus enable highly concentrated solutions to be prepared, which can also be used as stock solutions.

If a mixture of polyester and polyacrylonitrile fibers is to be dyed, the reserve of the polyacrylonitrile fiber depends on the constitution of the dyestuff, the substituents $R_4$, $R_5$ and $R_6$ and on the pH of the dyebath. The reserve will be the more complete, the more strongly negative are the substituents in the radicals $R_5$ and $R_6$, the nearer the position of these substituents is to the quaternary nitrogen atom, and the more the pH of the dyebath approaches the neutral point.

The dyestuffs to be used according to the present process can easily be stored without decomposition for several days and even weeks in a strongly acidic solution at pH 2–3 and at 20° C.; they thus permit the preparation of clear stock solutions without the addition of textile auxiliaries which are otherwise required for the application of the usual disperse dyestuffs. The storage life of the dyestuff solutions depends on the pH of the solution and the basicity of the ammonium nitrogen of the dyestuffs, generally in such a manner that a more acidic solution and a stronger basicity of the ammonium nitrogen increase the stability of the dyestuff solutions. If the ammonium nitrogen has a medium to strong basicity, 80 percent of the solutions are still unchanged after 1 hour at pH 3 and at boiling temperature. This surprising fact not only permits the preparation of stable stock solutions, but also makes unnecessary the usual expensive and laborious transformation of water-insoluble and barely water-soluble disperse dyestuffs into finely dispersed dyeing mixtures. The latter have the additional disadvantage that they can generally not be stored for more than 2–3 hours without noticeable sedimentation and thus frequently give rise to faulty dyeings.

Another advantage of using the dyestuffs which contain at least one grouping of the formula (I) consists in that these dyestuffs can also be applied from an acidic bath; this is advantageous for the dyeing of mixed fabrics containing natural superpolyamide and polyacrylonitrile fibers which are dyed in an acid medium. For the latter, in particular, a suitable choice of dyestuffs offers the possibility to dye the components of the mixed fabric tone-in-tone or in different shades in a single bath.

In the following examples the temperatures are given in degrees Centigrade.

EXAMPLE 1

One gram of the dyestuff No. 1 of the table below is dissolved with 2 g. of glacial acetic acid and a little water and this solution is diluted with water to give 400 ml. Two grams cresotic acid methyl ester and 6 g. sodium acetate are then added. The pH is thereby adjusted to about 5. One hundred grams of previously cleaned polyethylene terephthalate fabric are introduced into the dyebath at 50°, the temperature is raised to 98°–100° within 30 minutes and this temperature is maintained for 1 hour. The fabric thus dyed is rinsed first hot and then cold and finally dried. A full red dyeing of good fastness to light, washing and sublimation is obtained.

EXAMPLE 2

When the procedure of example 1 is followed with the use of 100 g. of fiber material of synthetic superpolyamide and omitting the cresotic acid methyl ester, a full red dyeing is also obtained.

EXAMPLE 3

When the procedure of example 1 is followed with the use of a mixture of 100 g. polyethylene terephthalate and 100 g. of polyacrylonitrile fibers, the polyester fiber is dyed in a full red shade, whereas the polyacrylonitrile fiber remains virtually undyed. If any basic dyestuff for polyacrylonitrile fibers is simultaneously added to the dyebath, then a corresponding dyeing of the polyacrylonitrile fiber is obtained at the same time without interference.

EXAMPLE 4

When the procedure of example 3 is followed with the use of dyestuff No. 14 of the table, only the polyester component is again dyed in a full yellow shade.

EXAMPLE 5

When the procedure of example 1 is followed with the use of 100 g. of polyester fibers and 100 g. of wool and with the use of dyestuff No. 13 of the table, a full yellow dyeing is obtained on the polyester fibers.

EXAMPLE 6

When the procedure of example 1 is followed with the use of 100 g. of synthetic superpolyamide fibers and of the dyestuff No. 29 of the table, then a yellow dyeing is obtained.

The other azo dyestuffs listed in the table can be applied in basically the same manner, yielding the specified shades.

TABLE
| | Dyestuff | Shade of dyeing on polyester fibres |
|---|---|---|
| 1 | 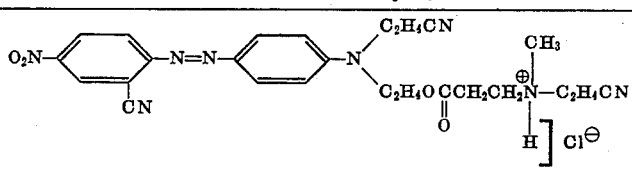 | Red. |
| 2 | 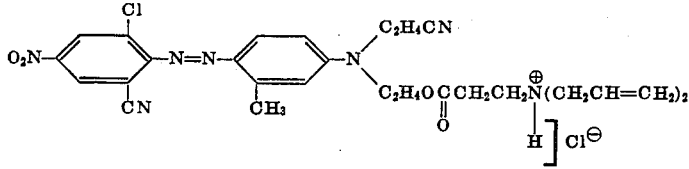 | Violet. |
| 3 | 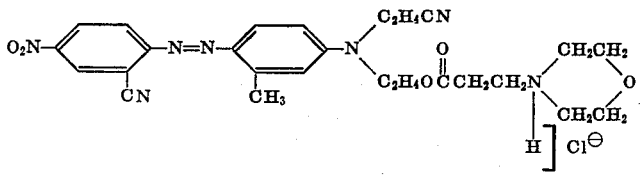 | Red. |
| 4 | 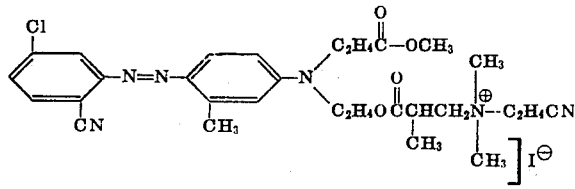 | Orange. |
| 5 | 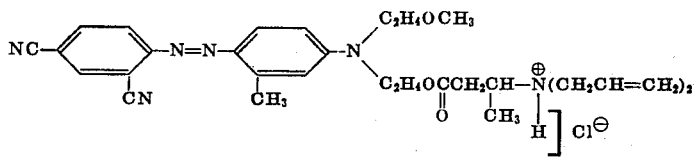 | Red. |
| 6 | 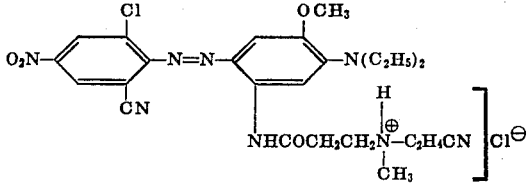 | Blue. |
| 7 | 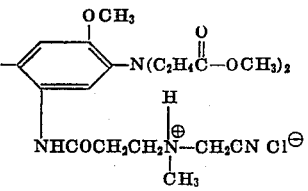 | Do. |
| 8 | 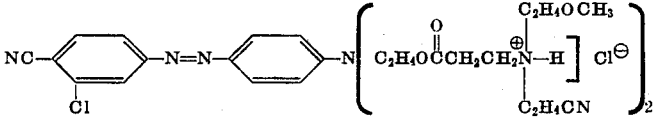 | Orange. |
| 9 | 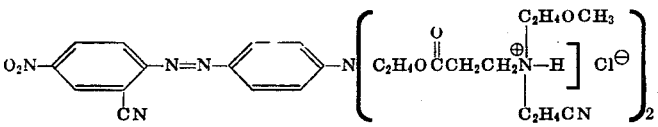 | Red. |
| 10 | 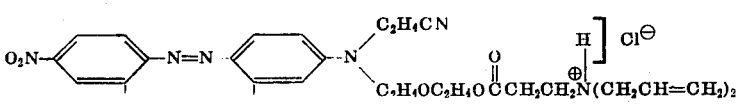 | Red. |

| Dyestuff | Shade of dyeing on polyester fibres |
|---|---|
| 11. (structure) | Brown. |
| 12. (structure) | Orange. |
| 13. (structure) | Yellow. |
| 14. (structure) | Do. |
| 15. (structure) | Do. |
| 16. (structure) | Do. |
| 17. (structure) | Do. |
| 18. (structure) | Blue. |
| 19. (structure) | Do. |

| Dyestuff | Shade of dyeing on polyester fibres |
|---|---|
| 20 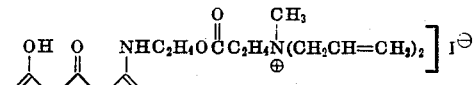 | Do. |
| 21 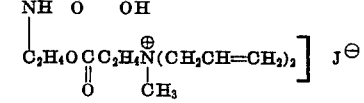 | Red. |
| 22 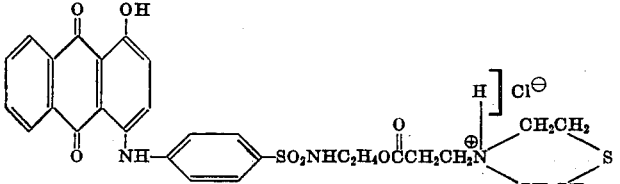 | Yellow. |
| 23 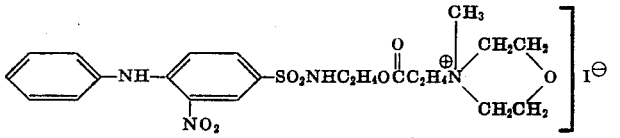 | Orange. |
| 24 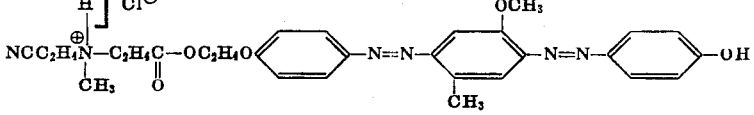 | Do. |
| 25 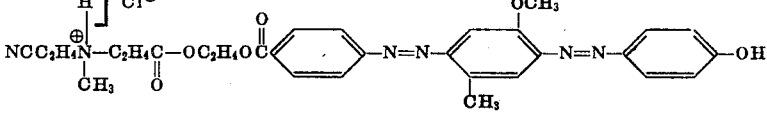 | Yellow. |
| 26 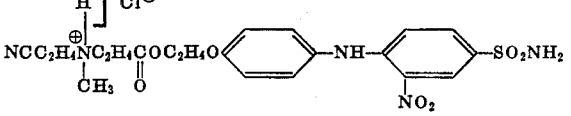 | Do. |
| 27 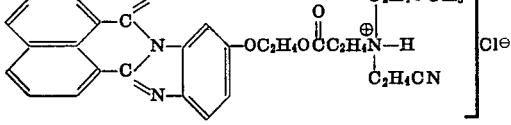 | White. |
| 28 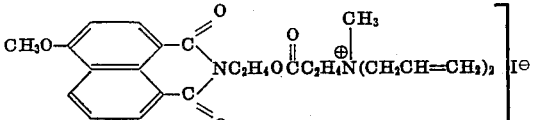 | Do. |
| 29 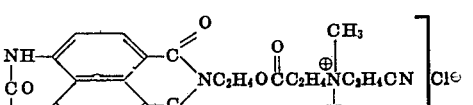 | Yellow. |

| | Dyestuff | Shade of dyeing on polyester fibres |
|---|---|---|
| 30 | ![structure 30] | Red. |
| 31 | ![structure 31] | Red. |
| 32 | ![structure 32] | Red. |
| 33 | ![structure 33] | Red. |
| 34 | ![structure 34] | Red. |
| 35 | ![structure 35] | Yellow. |

I claim:

1. Process for dyeing aromatic polyester fiber materials comprising applying to said fiber an aqueous acidic solution at a pH of 4–6.5 at an elevated temperature, of a dyestuff free of sulfonic and carboxylic acid groups having the formula

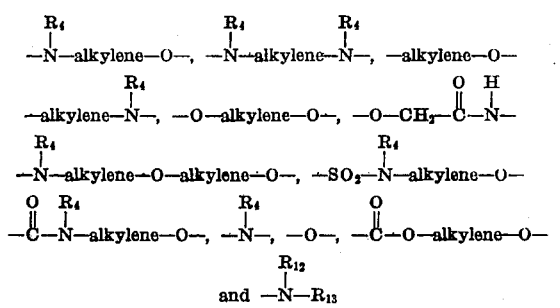

wherein D is an organic dyestuff radical;

X is attached to an aromatic carbon atom of said dyestuff radical D;

X represents a direct linkage, or a linking radical selected from the group consisting of

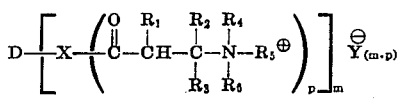

$R_{12}$ and $R_{13}$ are independently selected from the group consisting of cyano-lower-alkyl, hydroxy-lower-alkyl, halo-lower-alkyl, esterified hydroxy-lower-alkyl, esterified carboxy-lower-alkyl, lower-alkoxy-lower-alkyl, -alkylene-O- and -alkylene-O-alkylene-O-, wherein at least one of said $R_{12}$ and $R_{13}$ is -alkylene-O- or -alkylene-O-alkylene-O-;

alkylene is a lower-alkylene radical having up to four carbon atoms;

$R_1$, $R_2$ and $R_3$ are hydrogen or lower alkyl with up to two carbon atoms;

$R_4$ is an unbranched radical $C_nH_{(2n+1)}$ wherein $n$ is 0 to 4;

$R_5$ is $R_4$, lower-alkenyl, lower-alkoxyalkyl, lower-carboalkoxyalkyl, lower-isoalkyl, lower-alkylthioalkyl, or lower-alkyl-carbonyl-alkyl;

$R_6$ is lower-alkenyl, lower-alkoxyalkyl, lower-carboalkoxyalkyl, lower-isoalkyl, lower-alkylthioalkyl, or lower-alkyl-carbonyl-alkyl, lower-cyanoalkyl or taken together with $R_5$ forms a 6-membered heterocyclic ring containing O, S or N as a hetero-atom;

Y is an anion;

$p$ is 1 or 2;

$m$ is 1 or 2;

with the proviso that $p+m=2$ or 3.

2. The process of claim 1 wherein D is a monoazo dyestuff radical.

3. The process of claim 1 wherein D is

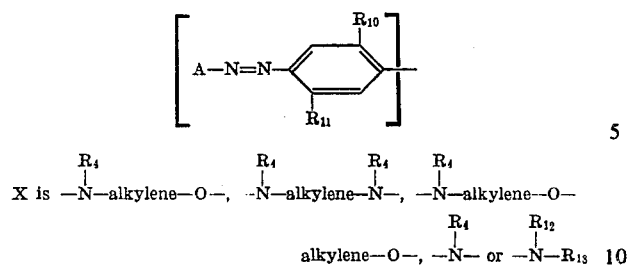

X is $-\overset{R_4}{\underset{|}{N}}-$alkylene$-$O$-$, $-\overset{R_4}{\underset{|}{N}}-$alkylene$-\overset{R_4}{\underset{|}{N}}-$, $-\overset{R_4}{\underset{|}{N}}-$alkylene$-$O$-$ alkylene$-$O$-$, $-\overset{R_4}{\underset{|}{N}}-$ or $-\overset{R_{12}}{\underset{|}{N}}-R_{13}$ $R_1$, $R_2$ and $R_3$ are H;

$R_{10}$ is H, lower-alkyl or lower-alkoxy;

$R_{11}$ is H, lower-alkyl, lower-alkoxy or acylamino;

A is a radical of carbocyclic or heterocyclic diazo component.

4. The process of claim 3 wherein $m$ is 1, and A is a carbocyclic radical.

5. Process for dyeing aromatic polyester fiber material comprising applying to said fiber an aqueous acidic solution at a pH of 4–6.5 at an elevated temperature, of a dyestuff free of sulfonic and carboxylic acid groups having the formula

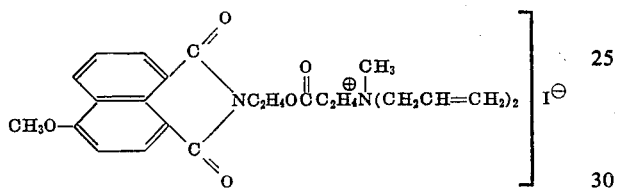

6. Process for dyeing aromatic polyester fiber material comprising applying to said fiber an aqueous acidic solution at a pH of 4–6.5 at an elevated temperature, of a dyestuff free of sulfonic and carboxylic acid groups having the formula

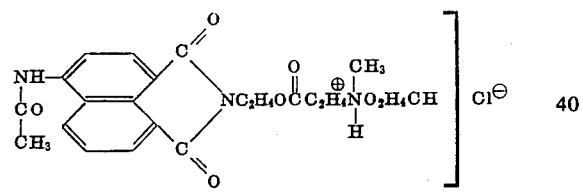

7. Process for dyeing fiber materials selected from the group consisting of aromatic polyesters, blends of polyester with wool, cellulose acetates and synthetic superpolyamides comprising applying to said fiber an aqueous acidic solution at a pH of 4–6.5 at an elevated temperature, of a dyestuff free of sulfonic and carboxylic acid groups having the formula

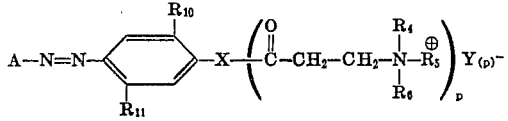

wherein A is a radical of carbocyclic or heterocyclic diazo component;

X is $-\overset{R_4}{\underset{|}{N}}-$alkylene$-$O$-$, $-\overset{R_4}{\underset{|}{N}}-$alkylene$-\overset{R_4}{\underset{|}{N}}-$ $-\overset{R_4}{\underset{|}{N}}-$alkylene$-$O$-$alkylene$-$O$-$, $-\overset{R_4}{\underset{|}{N}}-$ or $-\overset{R_{12}}{\underset{|}{N}}-R_{13}$ Y is an anion;

$R_4$ is an unbranched radical $C_nH_{(2n+1)}$ wherein $n$ is 0 to 4;

$R_5$ is $R_4$, lower-alkenyl, lower-alkoxyalkyl, lower-carboalkoxyalkyl, lower-isoalkyl, lower-alkylthioalkyl, or lower-alkyl-carbonyl-alkyl;

$R_6$ is lower-alkenyl, lower-alkoxyalkyl, lower-carboalkoxyalkyl, carboalkoxyalkyl, lower-isoalkyl, lower-alkylthioalkyl, lower-alkyl-carbonyl-alkyl, lower-cyanoalkyl or taken together with $R_5$ forms a 6-membered heterocyclic ring containing O, S or N as a hetero-atom;

$R_{10}$ is H, lower-alkyl or lower-alkoxy;

$R_{11}$ is H, lower-alkyl, lower-alkoxy or acylamino;

$R_{12}$ and $R_{13}$ are independently selected from the group consisting of cyano-lower-alkyl, hydroxy-lower-alkyl, halo-lower-alkyl, esterified hydroxy-lower-alkyl, esterified carboxy-lower-alkyl, lower-alkoxy-lower-alkyl, -alkylene-O- and -alkylene-O-alkylene-O-, wherein at least one of said $R_{12}$ and $R_{13}$ is -alkylene-O- or -alkylene-O-alkylene-O-; and $p$ is 1 or 2.

8. The process of claim 7 wherein the fiber material is a synthetic superpolyamide.

* * * * *

UNITED STATES PATENT OFFICE
CERTIFICATE OF CORRECTION

Patent No. 3,620,663　　　　　　　　　　Dated November 16, 1971

Inventor(s) WINFRIED KRUCKENBERG

It is certified that error appears in the above-identified patent and that said Letters Patent are hereby corrected as shown below:

| Column | Line | Error |
|---|---|---|
| 1 | 55 | "$-CH_2H_4OCH_3$" should read -- $-C_2H_4OCH_3$ -- |
| 1 | 55 | "$CH_2$ e.g., 3," should read -- $-CH_2COOCH_3$,- |
| 1 | 75 | After "With" insert --the exception of sulfonic acid and carboxylic acid groups, the --. |
| 2 | 1 | "ashalogen" should read -- as halogen --. |
| 2 | Formula (V) | Before Formula (V) insert -- or --. |
| 2 | Last Formula | 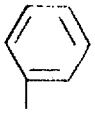 should read --  -- |
| 2 | 74 | Insert -- (VII) -- at far right corner of page. |
| 3 | 32 | "4-chlorbenzene" should read -- 4-chlorobenzene --. |
| 3 | 33 | "amino" should read -- 1-amino --. |

UNITED STATES PATENT OFFICE
CERTIFICATE OF CORRECTION

Patent No. 3,620,663  Dated November 16, 1971

Inventor(s) WINFRIED KRUCKENBERG   PAGE - 2

It is certified that error appears in the above-identified patent and that said Letters Patent are hereby corrected as shown below:

| Column | Line | Error |
|---|---|---|
| 3 | 1st Formula | "$OC_5$" should read -- $OC_4$ -- |
| 5 | Last formula | "$CHN\diagup^{CH_2COCH_3}$" should read -- $\underset{CH_3}{CHN}\diagup^{CH_2COCH_3}_{CH_2CH=CH_2}$ -- |
| 6 | Last formula | "(phenyl)" should read -- (phenyl-$NHCOC_2H_5$) -- |
| 9 | 10 | "(o-tolyl-N=N-o-tolyl)" should read -- (m-chlorophenyl-N=N-m-tolyl) -- |

UNITED STATES PATENT OFFICE
CERTIFICATE OF CORRECTION

Patent No. 3,620,663      Dated November 16, 1971

Inventor(s) WINFRIED KRUCKENBERG      PAGE - 3

It is certified that error appears in the above-identified patent and that said Letters Patent are hereby corrected as shown below:

| Column | Line | Error |
|---|---|---|
| 11 | 13 | " 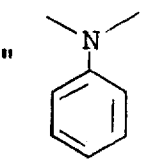 " should read -- 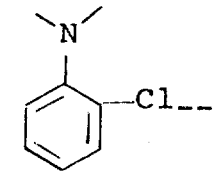 -- |
| 11 | 18 | " 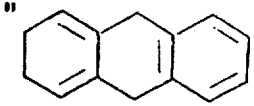 " should read -- 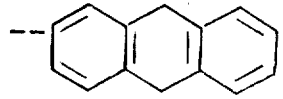 -- |
| 15 | 30 | "]Cl" should read -- ]Cl$^{\ominus}$ -- |
| 17 | Claim 6 | "NO$_2$H$_4$CH" should read -- NC$_2$H$_4$CN -- |
| 18 | 27 | delete "carboalkoxyalkyl". |

Signed and sealed this 4th day of July 1972.

(SEAL)
Attest:

EDWARD M. FLETCHER, JR.
Attesting Officer

ROBERT GOTTSCHALK
Commissioner of Patents